US011854737B2

(12) United States Patent
Ma et al.

(10) Patent No.: US 11,854,737 B2
(45) Date of Patent: Dec. 26, 2023

(54) DETACHABLE CRYOSTAT

(71) Applicant: Southwest Jiaotong University, Chengdu (CN)

(72) Inventors: Guangtong Ma, Chengdu (CN); Zhen Luo, Chengdu (CN); Xingchao Nie, Chengdu (CN); Ruichen Wang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 1017 days.

(21) Appl. No.: 16/708,451

(22) Filed: Dec. 10, 2019

(65) Prior Publication Data
US 2021/0065945 A1 Mar. 4, 2021

(30) Foreign Application Priority Data

Aug. 26, 2019 (CN) .......................... 201910790495.5

(51) Int. Cl.
*H01F 6/04* (2006.01)
*F17C 3/08* (2006.01)
*H01F 6/00* (2006.01)

(52) U.S. Cl.
CPC ............... *H01F 6/04* (2013.01); *F17C 3/085* (2013.01); *H01F 6/006* (2013.01); *F17C 2203/03* (2013.01); *F17C 2203/0643* (2013.01); *F17C 2221/012* (2013.01); *F17C 2221/014* (2013.01); *F17C 2221/016* (2013.01); *F17C 2221/017* (2013.01); *F17C 2223/0161* (2013.01)

(58) Field of Classification Search
CPC .. H01F 6/04; H01F 6/065; F17C 3/085; F17C 2203/03; F17C 2203/0643; F17C 2221/012; F17C 2221/014; F17C 2221/016; F17C 2221/017; F17C 2223/0161; Y02E 60/32; F25B 9/14
USPC .............................................................. 62/6
See application file for complete search history.

(56) References Cited

U.S. PATENT DOCUMENTS

| 4,930,318 A | * | 6/1990 | Brzozowski ......... F25D 19/006 62/51.1 |
| 5,584,184 A | * | 12/1996 | Inaguchi .................. H01F 6/04 62/51.1 |

(Continued)

*Primary Examiner* — Brian M King
*Assistant Examiner* — Ibrahim A. Michael Adeniji
(74) *Attorney, Agent, or Firm* — Bayramoglu Law Offices LLC

(57) ABSTRACT

A detachable cryostat includes many novel structures. Two radiation shields are installed in the detachable cryostat. One of the radiation shields is cooled by the second-stage cold chamber utilized to contain a cryogen, and the other one is cooled by the first-stage cold head of the cryocooler. These structures are both used for reducing heat loads from an outside. The resilient supporting device, the resilient circular sleeve, the bellows and the conductive blocks are utilized to achieve excellent thermal contact and complete thermal isolation between the cryocooler and the cryogen. A detachable binary current lead device can be introduced in the detachable cryostat, wherein, the detachable binary current lead includes a superconducting current lead and a copper current lead. When the installation adjustment mechanism is tightly pressed and loosened, it can enable the superconducting current lead to contact and separate from the copper current lead.

14 Claims, 6 Drawing Sheets

(56) References Cited

U.S. PATENT DOCUMENTS

| | | | | |
|---|---|---|---|---|
| 5,711,157 A | * | 1/1998 | Ohtani | H01F 6/04 |
| | | | | 62/467 |
| 2006/0086101 A1 | * | 4/2006 | Miki | F17C 1/00 |
| | | | | 62/48.2 |
| 2008/0104968 A1 | * | 5/2008 | Radovinsky | F25D 19/006 |
| | | | | 165/185 |

* cited by examiner

DETACHABLE CRYOSTAT

CROSS REFERENCE TO THE RELATED APPLICATIONS

This application is based upon and claims priority to Chinese Patent Application No. 201910790495.5, filed on Aug. 26, 2019, the entire contents of which are incorporated herein by reference.

TECHNICAL FIELD

The present disclosure relates to the field of cryogenic apparatuses for refrigerating low temperature products and particularly to a detachable cryostat.

BACKGROUND

The detachable cryostat is an apparatus commonly used in conjunction with superconducting magnets. Besides, a cryostat can be used for many technical fields including transportation, energy sources and biomedicine. For example, superconducting magnets and the cryostat can be used for superconducting maglev trains, superconducting electric vehicles and superconducting electromagnetic ship propulsion systems within the transportation field. The superconducting magnets and the cryostat are used in flywheel energy storage, superconducting direct current motors and superconducting generators within the energy source field. They can also be used for magnetic resonance imaging (MRI) technique and nuclear magnetic resonance (NMR) technique within the biomedicine field.

Most of the existing cryostats mainly include an outer container, a radiation shield, a cold chamber placed in the container for containing a cryogen, and a cryocooler for refrigerating the cold chamber. The cryostat with the above-mentioned structure is capable of establishing a stable ultralow temperature environment for a long period of time. However, there are still some deficiencies as follows.

Since the cryocooler is fixed on the cryostat by a flange plate and other structures. In addition, it is connected to the cryostat by a vacuum connection, thus it makes the cryocooler incapable of being pulled out of the cryostat when the cryocooler is not operating. And a large amount of heat is transferred into the cryostat by the cryocooler resulting in an issue of a large heat leakage of the cryostat.

In order to reduce the heat leakage by the cryocooler when it is not operating, in the prior art, the members connected to the cryocooler and the cryostat are removed through multiple processes. However, since the heat transfer members in the cryostat are tightly affixed to the cold head of the cryocooler, it is time-consuming and troublesome to pull out the cryocooler.

SUMMARY

In order to overcome the above-mentioned deficiencies in the prior art, the present disclosure provides a detachable cryostat which is capable of allowing the cold head of the cryocooler to pop up from the cryostat by a resilient supporting device matched with a resilient circular sleeve when the resilient supporting device is loosened.

In order to achieve the above objectives, the technical solutions employed by the present disclosure are as follows.

A detachable cryostat includes a cryocooler and a cryostat with a vacuum internal environment, wherein a first-stage cold chamber for containing a cryogen is placed in the first-stage radiation shield of the cryostat. The top wall of the cryostat and the first-stage cold chamber can provide with a resilient circular sleeve extending toward an interior of the cryostat and a first-stage bellows extending toward an interior of the first-stage cold chamber, respectively.

A first lower conductive block connected to a top wall of the first-stage radiation shield is fixed at the middle portion of the resilient circular sleeve. The bottom of the resilient circular sleeve and the bottom of the first-stage bellows are respectively sealed with a second upper conductive block and a second lower conductive block. And the resilient circular sleeve extends into the first-stage bellows when extended.

A first-stage cold head of the cryocooler is sleeved with a first upper conductive block matched with the first lower conductive block. A second-stage cold head of the cryocooler is used for driving the second upper conductive block to be tightly matched with the second lower conductive block. The cryocooler is installed on the top wall of the cryostat by a resilient supporting device, and an upper end of the resilient circular sleeve is fixed on the resilient supporting device.

When the resilient supporting device is tightly pressed, the first upper conductive block tightly contacts the first lower conductive block and the second lower conductive block tightly contacts with the second upper conductive block. When the resilient supporting device is loosened, the first upper conductive block is separated from the first lower conductive block and the second lower conductive block is separated from the second upper conductive block.

Further, the resilient circular sleeve includes a first-stage bellows sleeve fixed on the resilient supporting device and a second-stage bellows sleeve located in the first-stage radiation shield. The first-stage bellows sleeve is fixedly connected to the second-stage bellows sleeve by the first lower conductive block and the second-stage bellows sleeve extends into the first-stage bellows when extended. The second upper conductive block is fixed to the bottom of the second-stage bellows sleeve.

Further, the resilient supporting device includes a lower flange installed on the top wall of the cryostat by a connecting sleeve, and an upper flange sleeved on the cryocooler. Opposite faces of the upper flange and the lower flange are provided with annular grooves matched with one another. A resilient member is placed in the annular groove and the upper flange and the lower flange are fastened by a locking member. A sealing ring is installed between the extension of the upper flange and the lower flange.

Further, the resilient circular sleeve is provided with a first vacuum tube, to the first vacuum tube and the resilient circular sleeve communicate, and a free end of the first vacuum tube extends to an outside of the cryostat.

Further, when the first-stage cold chamber is used for placing superconducting magnets, the first-stage cold chamber further includes at least a pair of binary current leads fixed to the top end of the cryostat and extending into the first-stage cold chamber, and the binary current leads are connected to the first lower conductive block by copper braids and to an insulating layer made of a conductive material for cooling.

Further, the binary current lead includes a superconducting current lead and a copper current lead which are designed to be separated. The copper current lead is fixed to the cryostat by the installation adjustment mechanism, wherein the superconducting current lead contacts the copper current lead when the installation adjustment mechanism is tightly pressed; and the superconducting current lead is separated from the copper current lead when the installation adjustment mechanism is loosened.

Further, when the first-stage cold chamber is used for placing superconducting magnets, the first-stage cold chamber further includes a detachable binary current lead device. The detachable binary current lead device includes a superconducting current lead and a copper current lead which are designed to be separated, and a second-stage cold chamber installed in the cryostat for storing the cryogen and cooling the copper current lead. The superconducting current lead extends into the first-stage cold chamber and is fixed on the top wall of the first-stage cold chamber.

The copper current lead extends to the cryostat and is partially placed in a metal sleeve fixed on the top wall of the cryostat. The bellows sleeve connected to the second-stage cold chamber is fixed at the bottom of the second-stage cold chamber. The metal sleeve passes through the second-stage cold chamber and extends into the bellows sleeve.

A sealing structure for preventing the cryogen in the second-stage cold chamber from leaking out of one end of the bellows sleeve is fixedly installed between a lower end of the bellows sleeve, a lower end of the copper current lead and a lower end of the metal sleeve. The lower end of the copper current lead passes through the sealing structure. The copper current lead is fixed to the cryostat by the installation adjustment mechanism, wherein the superconducting current lead contacts the copper current lead when the installation adjustment mechanism is tightly pressed, and the superconducting current lead is separated from the copper current lead when the installation adjustment mechanism is loosened.

The present disclosure has the following advantages. In the present solution, when the resilient supporting device is tightly pressed, the second-stage cold head of the cryocooler contacts the second upper conductive block, driving the resilient circular sleeve to extend downward so that the first upper conductive block tightly contacts the first lower conductive block, and the second upper conductive block tightly contacts the second lower conductive block, which transfers cold energy during the refrigeration process.

When the cooling process is completed, the first upper conductive block and the first lower conductive block that are in tight contact, and the second upper conductive block and the second lower conductive block that are in tight contact, are both separated by loosening the resilient supporting device under a combined action of the resilient supporting device and the resilient circular sleeve. After that, the cryocooler is pulled out of the cryostat and an inlet of the cryocooler is sealed by a sealing cover.

The process of separating the cryocooler needs less effort and is convenient to operate. Moreover, after the cryocooler is pulled out, since the second upper conductive block does not contact the second lower conductive block, and there is a vacuum environment between the second upper conductive block with a resilient circular sleeve and the second lower conductive block with a first-stage bellows, the external heat is prevented from being radiated into the first-stage cold chamber through the resilient circular sleeve, thereby it can protect the cryogen in the first-stage cold chamber.

The resilient circular sleeve includes a first-stage bellows sleeve and a second-stage bellows sleeve. The two-stage bellows sleeves not only can ensure effective contact between the first upper conductive block and the first lower conductive block but also the second upper conductive block and the second lower conductive block due to the flexible telescoping properties thereof.

The resilient supporting device consists of the upper flange, the lower flange, the resilient member and the locking member. When the locking member is unscrewed, the first upper conductive block and the second upper conductive block are separated from the first lower conductive block and the second lower conductive block, respectively, due to a deformation recovery of the resilient member as well as the resilient circular sleeve, allowing a part of the cryocooler to pop out of the cryostat. The resilient supporting device has the advantages of compact structure, easy operation and quick separation of the cryocooler so that can save time and labor.

The cold head of the cryocooler is pulled out at the same time nitrogen is introduced into the resilient circular sleeve through the first vacuum tube, which prevents air from entering the resilient circular sleeve and forming frosts. After the cryocooler is pulled out, the sealing cover is installed at an inlet of the cryocooler. Then the resilient circular sleeve can be vacuumized by the first vacuum tube and heat in the atmosphere can be isolated from entering the resilient circular sleeve so as to block an effect of heat in the atmosphere on the cryogen in the first-stage cold chamber.

When the superconducting magnets are placed in the first-stage cold chamber, in the present solution, the cryostat is further provided with the detachable binary current lead device. Since the copper current lead and the superconducting current lead are separated, and when power is needed, the copper current lead and the bellows sleeve can be driven downward by the force applied to the installation adjustment mechanism to contact the superconducting current lead, which achieves the power feeding to the superconducting magnets. During the power feeding process, the copper current lead is located in the first-stage cold chamber and the cryogen can suppress the heat leakage when the copper current lead is fed.

After the superconducting magnets are excited, the copper current lead and the bellows sleeve can be moved upward by the installation adjustment mechanism so as to separate the copper current lead from the superconducting current lead. In this way, the external heat is prevented from entering the cryogenic system where the superconducting magnets are located in through the binary current leads.

In addition, since the mutually matched contact portions of the copper current lead and the superconducting current lead are located in the cryostat. Both the operating state and the separated state are in a vacuum environment, thus it avoids frost formation occurring on a contact end of the copper current lead and the superconducting current lead after the separation.

Figure 1:
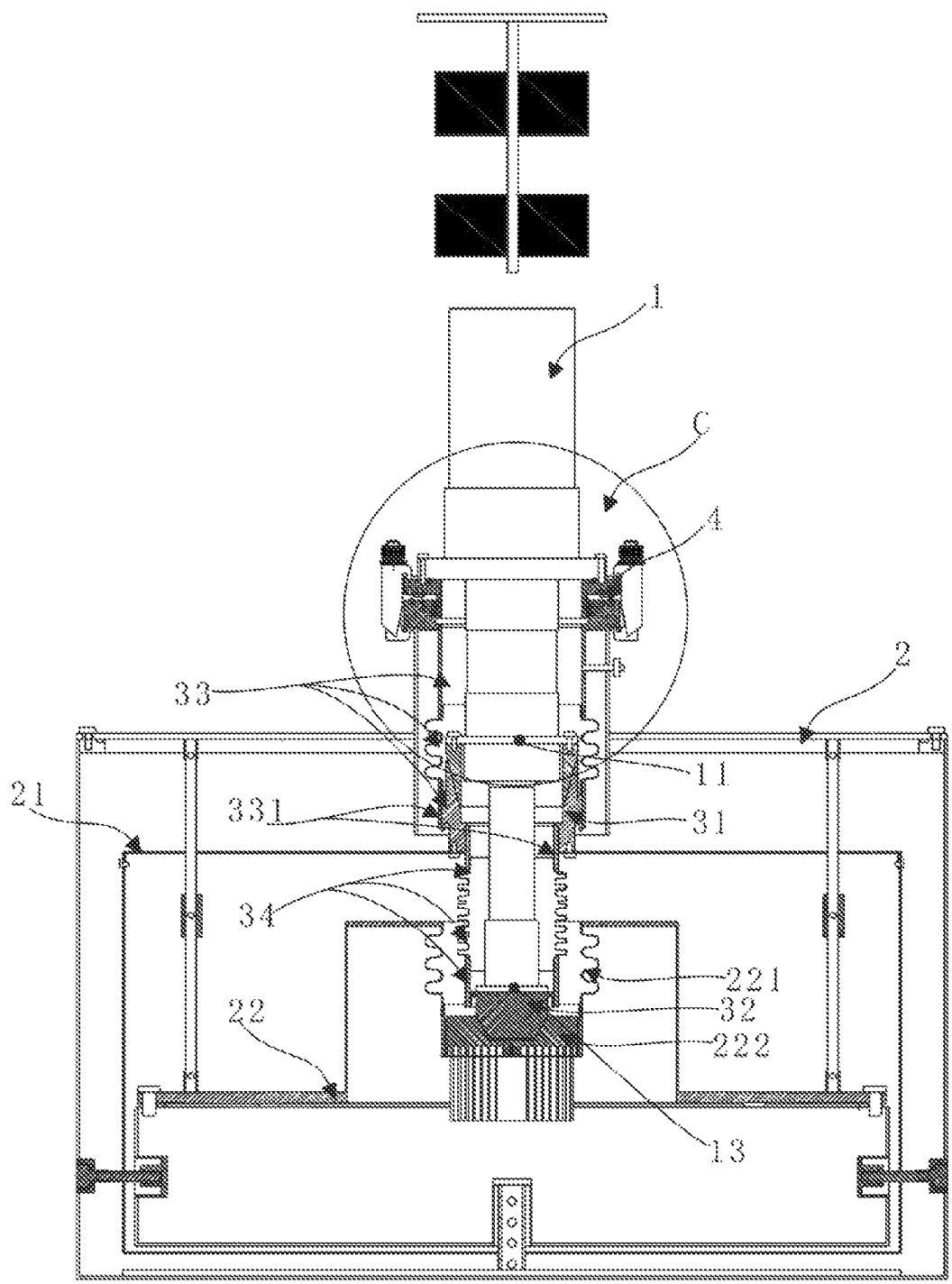
FIG. 1 is a structural schematic diagram of a cryostat.

In the drawings, 1, cryocooler; 11, first-stage cold head; 12, first upper conductive block; 13, second-stage cold head;

2, cryostat; 21, first-stage radiation shield; 22, first-stage cold chamber; 221, first-stage bellows; 222, second lower conductive block; 223, stainless steel block; 224, sealing sleeve; 23, second-stage radiation shield; 24, connecting sleeve; 25, first support member; 26, second support member; 3, resilient circular sleeve;

31, first lower conductive block; 32, second upper conductive block; 33, first-stage bellows sleeve; 331, cylindrical straight-through pipe; 34, second-stage bellows sleeve; 35, first vacuum tube; 4, resilient supporting device; 41, upper flange; 42, lower flange; 43, annular groove; 44, resilient member; 45, locking member; 46, sealing ring; 5, detachable binary current lead device; 51, copper current lead; 52, superconducting current lead;

53, second-stage cold chamber; 531, bellows sleeve; 532, sealing structure; 5321, base; 5322, sealing portion; 54, metal sleeve; 541, cryogen inlet; 55, installation adjustment mechanism; 551, pressing cover; 5511, extending portion; 5512, sealing member; 5513, snap-fit groove; 552, connecting member; 553, protrusion; 5531, through hole; 56, connecting sleeve; 57, support sleeve; 571, fiber reinforced plastic plate; 58, second vacuum tube; and 581, vacuum valve.

DETAILED DESCRIPTION OF THE EMBODIMENTS

The specific embodiments of the present disclosure will be described hereinafter to allow those skilled in the art to understand the present disclosure. However, it should be noted that the present disclosure is not limited to the scope of the specific embodiments. For those skilled in the art, if various changes are within the spirit and scope of the present disclosure defined by the claims, these changes are obvious, and all inventions and creations based on the inventive concept of the present disclosure shall fall within the scope of protection of the present disclosure.

As shown in FIG. 1, the detachable cryostat 2 includes the cryocooler 1 (i.e. the G-M cryocooler 1) and the cryostat 2 with a vacuum internal environment inside. The first-stage cold chamber 22 for containing the cryogen is placed in the first-stage radiation shield 21 of the cryostat 2. The cryostat 2 is mainly used to insulate a part of the external heat. The cryostat 2 and the first-stage cold chamber 22 are made of a material with low thermal conductivity (e.g. stainless steel). The cryogen stored in the first-stage cold chamber 22 includes liquid nitrogen, liquid helium, liquid argon, liquid helium or liquid hydrogen. The first-stage radiation shield 21 is made of a material with high thermal conductivity, such as copper and aluminum, which is used for reducing the radiation heat transferred from outside to the first-stage cold chamber 22, and protecting cryogen in the first-stage cold chamber 22.

The present solution employs an operating mode that the G-M cryocooler cooperates with the cryostat. Therefore, the temperature of the cryogen inside the cryostat can be further decreased and reached 20 K or below when the cryocooler is in the operation state, while the conventional cryostat can only store the liquid nitrogen at 77 K.

The upper wall of the cryostat 2 and the upper wall of the first-stage cold chamber 22 are provided with the resilient circular sleeve 3 and the first-stage bellows 221 extending toward the interior of the cryostat 2 and the first-stage cold chamber 22, respectively. The resilient circular sleeve 3 is mainly used for containing the cold heads of the cryocooler 1. The first-stage bellows 221 extends or contracts to facilitate the cryocooler 1 to cool down the first-stage cold chamber 22.

The middle portion of the resilient circular sleeve 3 is fixed with the first lower conductive block 31 connected to the top wall of the first-stage radiation shield 21. The bottom of the resilient circular sleeve 3 and the first-stage bellows 221 are respectively sealed with the second upper conductive block 32 and the second lower conductive block 222. The resilient circular sleeve 3 can extend into the first-stage bellows 221 when extended. The first-stage cold head 11 of the cryocooler 1 is sleeved with the first upper conductive block 12 matched with the first lower conductive block 31. The second-stage cold head 13 of the cryocooler 1 is used for driving the second upper conductive block 32 to be tightly fixed to the second lower conductive block 222.

When the cold head of the cryocooler 1 is inserted into the resilient circular sleeve 3, the first upper conductive block 12 connected to the first-stage cold head 11 of the cryocooler 1 contacts the first lower conductive block 31. Therefore, the cold energy of the first-stage cold head 11 is transferred to the first-stage radiation shield 21 by the first upper conductive block 12 and the first lower conductive block 31, thereby refrigerating the first-stage radiation shield 21.

When the second-stage cold head 13 of the cryocooler 1 contacts the second upper conductive block 32, the first-stage bellows 221 is stretched to contact the second lower conductive block 222. Therefore, the cold energy of the second-stage cold head 13 is transferred to the cryogen of the first-stage cold chamber 22 through the second upper conductive block 32 and the second lower conductive block 222, so as to maintain or decrease the temperature of the cryogen in the first-stage cold chamber 22.

In order to enhance the transfer efficiency of the cold energy of the second-stage cold head 13, in the present solution, fins are connected to the lower surface of the second lower conductive block 222.

In an embodiment of the present disclosure, the resilient circular sleeve 3 includes the first-stage bellows sleeve 33 fixed on the resilient supporting device 4 and the second-stage bellows sleeve 34 located in the first-stage radiation shield 21. The first-stage bellows sleeve 33 is fixedly connected to the second-stage bellows sleeve 34 by the first lower conductive block 31. The second-stage bellows sleeve 34 can extend into the first-stage bellows 221 when extended. The second upper conductive block 32 is fixed to the bottom of the second-stage bellows sleeve 34.

The two-stage bellows sleeves 531 can ensure contact effectively both between the first upper conductive block 12 and the first lower conductive block 31, the second upper conductive block 32 and the second lower conductive block 222 due to the flexible telescoping properties thereof.

When the preferred embodiment is implemented, the first-stage bellows sleeve 33 and the second-stage bellows sleeve 34 both include the bellows and the two cylindrical straight-through tubes 331. The two cylindrical straight-through tubes 331 are welded to both ends of the bellows. The two cylindrical straight-through tubes 331 adjacent to the first-stage bellows sleeve 33 and the second-stage bellows sleeve 34 are welded to the first lower conductive block 31, and the cylindrical straight-through tube 331 at the upper end of the first-stage bellows sleeve 33 is welded to the lower flange 42 of the resilient supporting device 4. The cylindrical straight-through tube 331 at the lower end of the first-stage bellows sleeve 33 is welded to the second lower conductive block 222.

According to FIG. 1, the cryocooler 1 is installed in the resilient circular sleeve 3 by the resilient supporting device 4. The upper end of the resilient circular sleeve 3 is fixed on the resilient supporting device 4. When the resilient supporting device 4 is tightly pressed, not only the first upper conductive block 12 is in close contact with the first lower conductive block 31 but also the second lower conductive block 222 can tightly contact the second upper conductive block 32. When the resilient supporting device 4 is loosened, the first upper conductive block 12 is separated from the first lower conductive block 31 and the second lower conductive block 222 can be separated from the second upper conductive block 32.

After the cryocooler 1 is pulled out, since the second upper conductive block 32 does not contact the second lower conductive block 222, there is a vacuum environment between the second upper conductive block 32 with the resilient circular sleeve 3 and the second lower conductive block 222 with the first-stage bellows 221, thereby preventing the external heat from being radiated into the first-stage cold chamber 22 through the resilient circular sleeve 3 and protecting the cryogen in the first-stage cold chamber.

Figure 2:
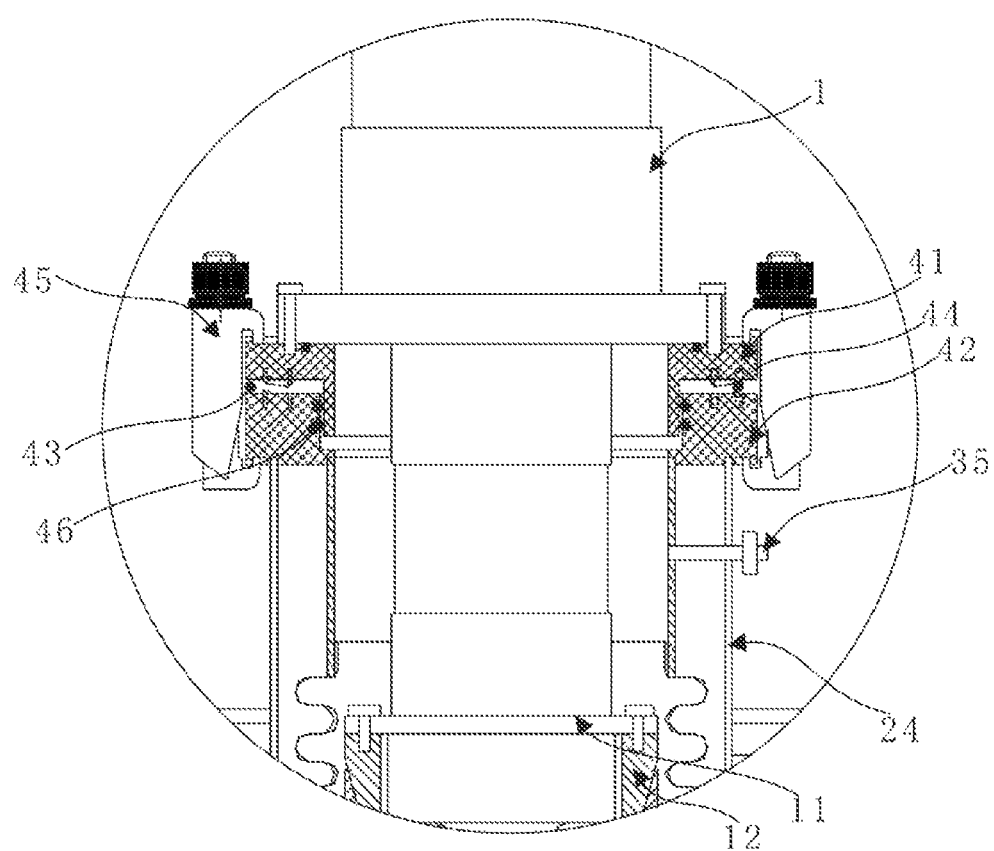
FIG. 2 is an enlarged view of the portion C in FIG. 1.

As shown in FIG. 2, the resilient supporting device 4 includes the lower flange 42 installed on the top wall of the cryostat 2 through the connecting sleeve 24, and the upper flange 41 sleeved on the cryocooler 1. The upper flange 41 is in a convex shape. The opposite faces of the upper flange 41 and the lower flange 42 with the annular grooves 43 can be matched with one another. The resilient member 44 is placed in the annular groove 43. The lower flange 42 and the upper flange 41 are fastened by the locking member 45. The sealing ring 46 is installed between the extension of the upper flange 41 extending into the lower flange 42 and the lower flange 42.

The resilient member 44 of the resilient supporting device 4, the resilient member 44 of the installation adjustment mechanism 55 mentioned hereinafter are springs or resilient materials having a relatively large elasticity. The locking member 45 can be a bolt, a stud bolt or a hook bolt.

As shown in FIG. 1, the resilient circular sleeve 3 is provided with the first vacuum tube 35. The first vacuum tube and the resilient circular sleeve 3 communicate. The free end of the first vacuum tube 35 extends to the outside of the cryostat 2, and the vacuum valve 581 is installed at the free end. In the present solution, the first vacuum tube 35 is preferably installed on the portion of the resilient circular sleeve 3 located outside the cryostat 2 so that the sealing materials can be used as little as possible.

The working principle of the cryocooler 1 will be illustrated as follows when the cryocooler 1 is installed or pulled out.

During the installation process, the cryocooler 1 and the upper flange 41 are integratedly connected by the bolts and sealed. When the cryocooler 1 and the upper flange 41 are integratedly installed in the resilient circular sleeve 3, the resilient circular sleeve 3 is vacuumized by the vacuum valve 581 of the first vacuum tube 35. At the same time, the compression spring and the hook bolt are tightened so that the upper flange 41 and the lower flange 42 are contacted and sealed well. And the first upper conductive block 12 connected to the first-stage cold head 11 is contacted well to the first lower conductive block 31 by the first-stage bellows sleeve 33. The second upper conductive block 32 in contact with the second-stage cold head 13 is also contacted well with the second lower conductive block 222 by the first-stage bellows 221.

When the cryocooler 1 starts operating, the first-stage cold head 11 and the second-stage cold head 13 simultaneously perform refrigeration. At this time, the cold energy provided by the first-stage cold head 11 cools the first-stage radiation shield 21 by the first upper conductive block 12 and the first lower conductive block 31 which are in contact with one another. The cold energy provided by the second-stage cold head 13 cools the cryogen in the first-stage cold chamber 22 by the cooling fins, the second upper conductive block 32 and the second lower conductive block 222 which are in contact with each other.

When the cryocooler 1 needs to be maintained or is pulled out, nitrogen can be introduced into the resilient circular sleeve 3 by the vacuum valve 581. Meanwhile, the hook bolt is loosened to separate the upper flange 41 and the lower flange 42. The spring, the first-stage bellows 221 and the resilient circular sleeve 3 drive the cryocooler 1 to be lifted so that the first upper conductive block 12 connected to the first-stage cold head 11 can be separated from the first lower conductive block 31 and the second upper conductive block 32 in contact with the second-stage cold head 13 can be separated from the second lower conductive block 222. At this time, the resilient circular sleeve 3 is separated from the first-stage bellows 221 and the separated gap is in a vacuum state, which can isolate the heat radiation.

When the cryocooler 1 is pulled out, since the resilient circular sleeve 3 is filled with nitrogen gas, there is no frost in the resilient circular sleeve 3. At this time, a sealing cover is sealed with the lower flange 42 by the hook bolt, and the vacuum valve 581 is stopped introducing nitrogen into the resilient circular sleeve 3. Finally, the resilient circular sleeve 3 is vacuumized again. Therefore, the heat in the atmosphere can be insulated from entering the resilient circular sleeve 3, thereby protecting the cryogen in the first-stage cold chamber 22.

In one embodiment of the present disclosure, when the first-stage cold chamber 22 is used for placing superconducting magnets, the cryostat 2 further includes at least a pair of binary current leads fixed to the top end of the cryostat 2 and extending into the first-stage cold chamber 22. The binary current leads are connected to the first lower conductive block 31 by the copper braids and the insulating layer made of a conductive material for cooling.

In the present solution, the temperature of the cryogen in the second-stage cold chamber 53 is much lower than the outside ambient temperature. The temperature of the cryogen in the first-stage cold chamber 22 is much lower than the temperature of the cryogen in the second-stage cold chamber 53.

The binary current lead includes the superconducting current lead 52 and the copper current lead 51 which are designed to be separated. The copper current lead 51 is fixed to the cryostat 2 by the installation adjustment mechanism 55, wherein the superconducting current lead 52 contacts the copper current lead 51 when the installation adjustment mechanism 55 is tightly pressed while the superconducting current lead 52 is separated from the copper current lead 51 when the installation adjustment mechanism 55 is loosened.

Specifically, both the superconducting current lead 52 and the copper current lead 51 are connected to the first lower conductive block 31 by the copper braids and the insulating layer made of a conductive material for cooling. The current leads are cooled by the cold energy generated by the first-stage cold head 11.

Specifically, the insulating layer is located between the copper braids and the contact surface of the superconducting current lead 52 and the copper current lead 51. While ensuring the conduction of cold energy can be ensured, the current through the superconducting current lead 52 and the copper current lead 51 can be prevented from being introduced to other metal parts by the copper braids.

Figure 3:
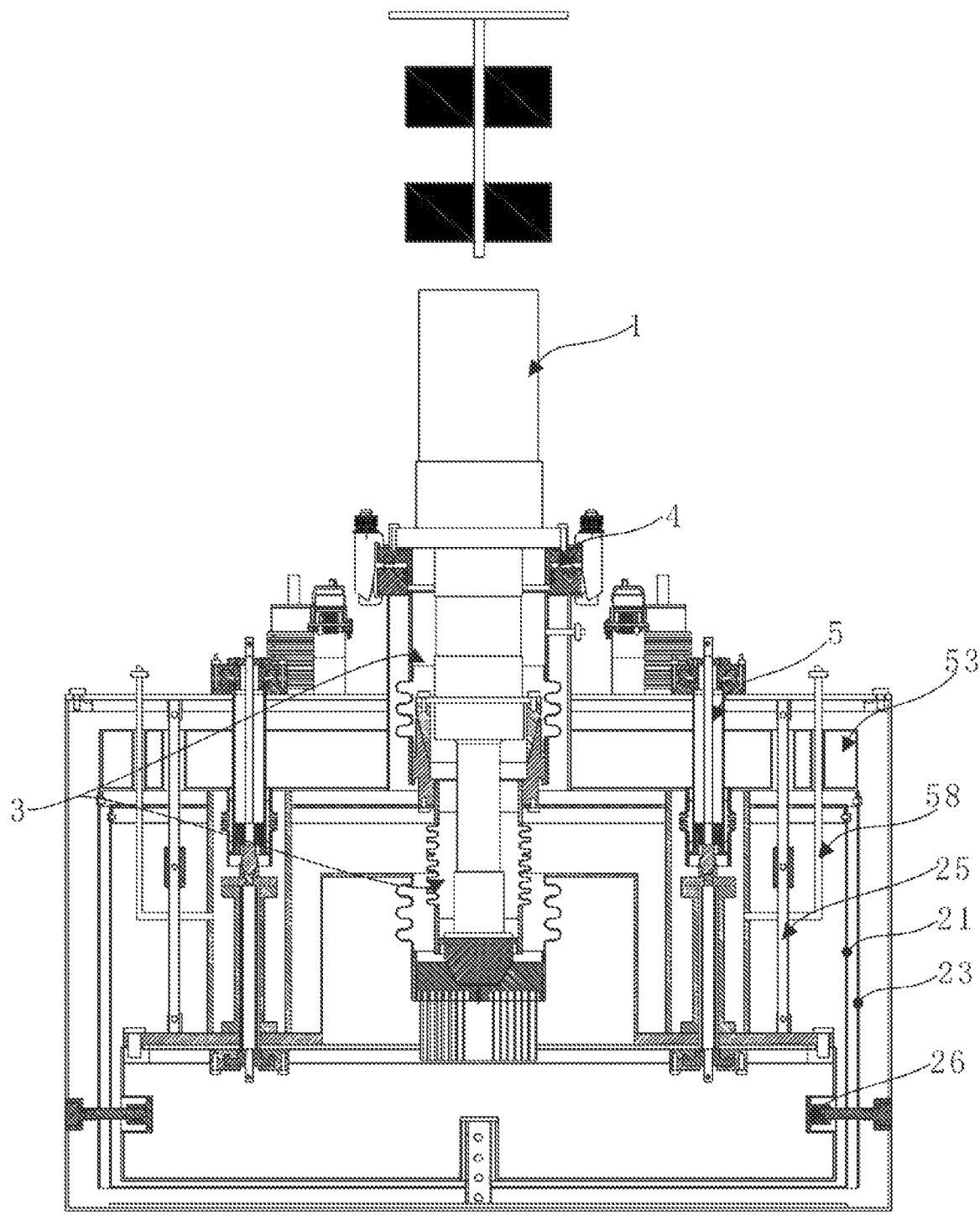
FIG. 3 is a structural schematic diagram showing a detachable binary current lead device installed in the cryostat.
Figure 4:
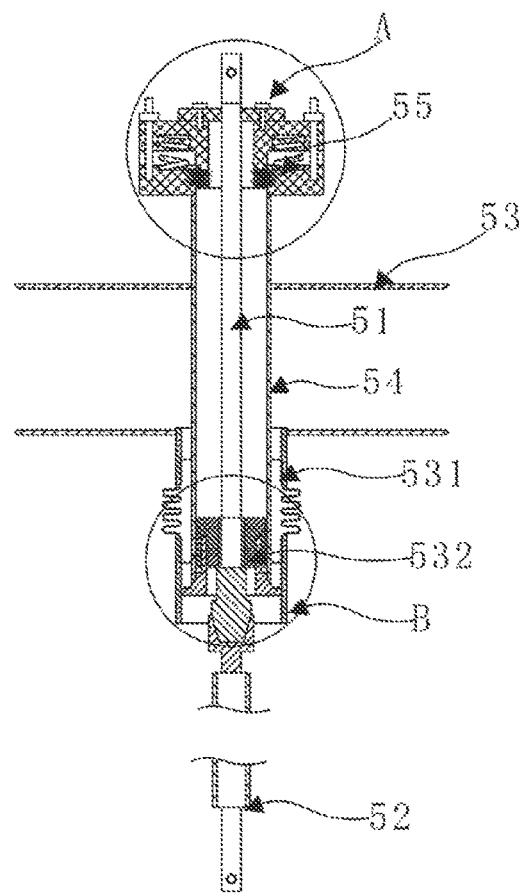
FIG. 4 is a structural schematic diagram of an embodiment of the detachable binary current lead device.

As shown in FIG. 3 and FIG. 4, when superconducting magnets are placed in the first-stage cold chamber 22, the cryostat 2 further includes the detachable binary current lead device 5. The detachable binary current lead device 5 not only includes the superconducting current lead 52 and the copper current lead 51 which are designed to be separated, but also the second-stage cold chamber 53 installed in the cryostat 2 for containing the cryogen and cooling the copper current lead 51. The superconducting current lead 52 can extend into the first-stage cold chamber 22 and can be fixed on the top wall of the first-stage cold chamber 22. The superconducting current lead 52 and the copper current lead 51 which are designed to be separated can only be connected together when feeding power to superconducting magnets.

Figure 8:
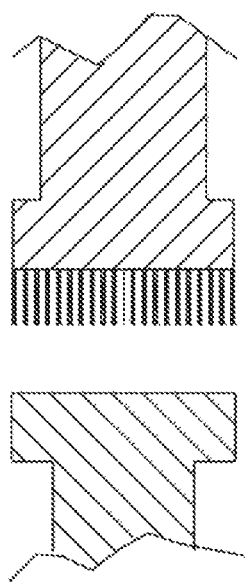
FIG. 8 is a structural schematic diagram when the plug and pull end is a plug and a socket.

As shown in FIG. 4 and FIG. 8. In order to ensure the stability of the current transmission. the matching ends of the superconducting current lead 52 and the copper current lead 51 are preferably arranged as a plug and pull end. To increase the contact area between the copper current lead 51 and the superconducting current lead 52, the plug and pull end can be set as a protrusion and a groove matched with one another, a plug and a socket matched with one another, and wavy surfaces matched with one another or sloped surfaces affixed to one another.

The copper current lead 51 extends into the cryostat 2 and is partially contained in the metal sleeve 54 fixed to the top wall of the cryostat 2. The bottom of the second-stage cold chamber 53 is fixed with the bellows sleeve 531. The metal sleeve 54 passes through the second-stage cold chamber 53 and extends into the bellows sleeve 531.

When the copper current lead 51 moves up and down, the bellows sleeve 531 can also extend and contract following the copper current lead 51, to facilitate insertion and removal of the copper current lead 51 and the superconducting current lead 52, and avoid the cryogen leakage of poor seal performance. In addition, only the lower end of the copper current lead 51 is located in the bellows sleeve 531 during the process of plugging in and out so that the heat entering from the outside is fully absorbed by the cryogen at the end of the copper current lead 51.

The second-stage cold chamber 53 and the bellows sleeve 531 constitute a chamber for containing the cryogen. The cryogen contained in the chamber may be liquid nitrogen, liquid helium, liquid argon, liquid helium or liquid hydrogen. The second-stage cold chamber 53 is configured not only to cool the copper current lead 51, a layer of radiation shield (made of copper or aluminum or equivalent material) can be added on the outside of the second-stage cold chamber 53 to provide a layer of radiation leakage protection device for the cryostat 2 in a conduction-cooling method to cool the radiation shield by the second-stage cold chamber 53.

The second-stage cold chamber 53 is made of copper or aluminum and the bellows sleeve 531 is made of stainless steel. The bellows sleeve 531 is welded to the bottom of the second-stage cold chamber 53 which integrally forms an inverted convex-shaped structure with the bellows sleeve 531. When the detachable binary current lead device 5 is applied to the cryostat 2, the second-stage cold chamber 53 is installed inside the cryostat 2 by a suspension device (a metal with poor thermal conductivity, e.g. a stainless steel tube). The top of the second-stage cold chamber 53 is provided with an inlet pipe and an outlet pipe of the cryogen, which is convenient for replenishing the cryogen and discharging the gas generated by the cryogen at any time.

The sealing structure 532 for preventing the cryogen in the second-stage cold chamber 53 from leaking out of the end of the bellows sleeve 531 is fixedly installed between the lower end of the bellows sleeve 531, the lower end of the copper current lead 51, and the lower end of the metal sleeve 54. The lower end of the copper current lead 51 passes through the sealing structure 532.

Figure 6:
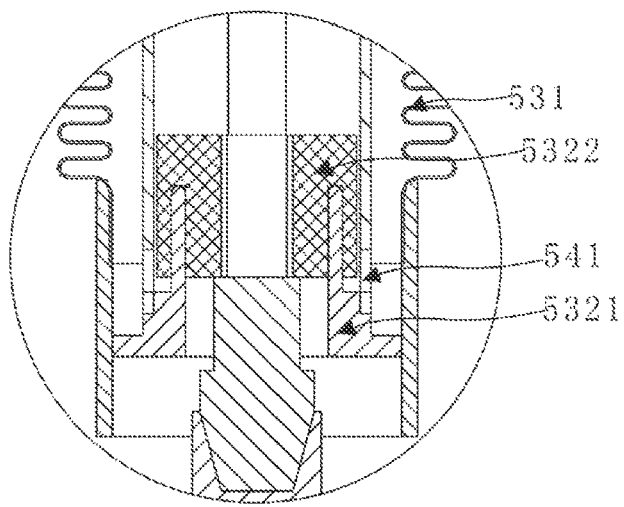
FIG. 6 is an enlarged view of the portion B in FIG. 4.

As shown in FIG. 6, when the preferred present embodiment is implemented, the sealing structure 532 includes the base 5321 sealed and fixed to the lower end of the bellows sleeve 531. The base 5321 includes a convex portion extending upward and a through hole allowing the lower end of the copper current lead 51 to pass through. The lower end of the copper current lead 51 is sleeved with the sealing portion 5322. The lower surface of the sealing portion 5322 is provided with the annular groove tightly matched with the convex portion.

Specifically, the lower end (the low-temperature end) of the copper current lead 51 is connected to the sealing portion 5322 by a threaded connection. Both the base 5321 and the metal sleeve 54 are made of stainless steel. The base 5321 is welded to the extending portion of the bellows sleeve 531.

Because there is the through hole 5531 on the base 5321, the cryogen in the second-stage cold chamber 53 may leak from the bellows sleeve 531 into the cryostat 2 due to a bad sealing. In the present solution, the annular groove and the convex portion are matched with one another by the sealing portion 5322, so there is no gap between the sealing portion 5322 and the base 5321, and between the sealing portion 5322 and the copper current lead 51, so as to achieve a better sealing performance.

When the present solution is implemented, the preferred sealing portion 5322 is made of a material that shrinks at a low temperature and the material that shrinks at a low temperature may be polytetrafluoroethylene or fluorinated ethylene propylene.

Due to the excellent shrinkage performance of the sealing portion 5322 in a low temperature environment, the sealing portion 5322 can shrink in a low temperature environment and tightly holds the copper current lead 51 as well as the convex portion of the base 5321 to form a structure in an interference fit, thereby preventing the cryogen from overflowing. The sealing portion 5322 achieves a sealing of the overall structure at a low temperature and insulates the copper current lead 51 from the bellows sleeve 531 at the same time.

Figure 5:
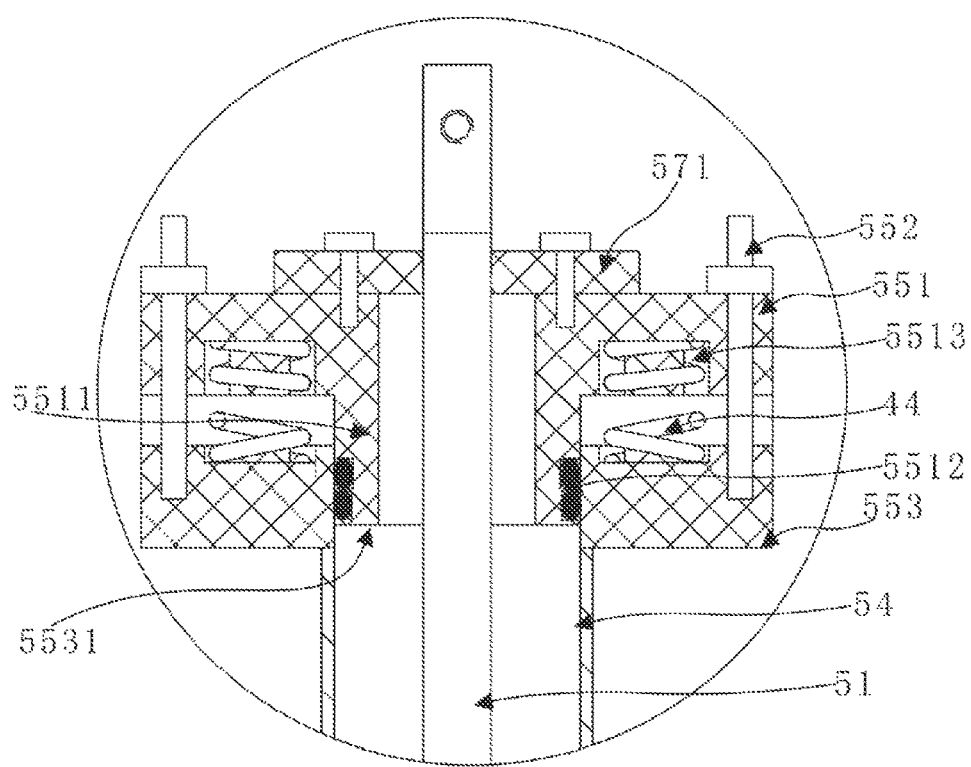
FIG. 5 is an enlarged view of the portion A in FIG. 4.

As shown in FIG. 5, the metal sleeve 54 has the cryogen inlet 541 allowing the cryogen in the second-stage cold chamber 53 to enter the metal sleeve 54 for cooling the sealing portion 5322 and the copper current lead 51. The cryogen inlet 541, which can let the cryogen cool the copper current lead 51 in the metal sleeve 54 and the sealing portion 5322.

According to FIG. 3 and FIG. 5, the copper current lead 51 is fixed to the cryostat 2 by the installation adjustment mechanism 55, wherein the superconducting current lead 52 contacts the copper current lead 51 when the installation adjustment mechanism 55 is tightly pressed; and the superconducting current lead 52 is separated from the copper current lead 51 when the installation adjustment mechanism 55 is loosened.

As shown in FIG. 5, in one embodiment of the present disclosure, the installation adjustment mechanism 55 include the protrusion 553 fixed to the upper end of the metal sleeve 54, and the pressing cover 551 matched with the protrusion 553 by the connecting member 552. The protrusion 553 is provided with the through hole 5531 allowing the extending portion 5511 on the pressing cover 551 (the copper current lead 51 passes through the extending portion 5511) to insert into the through hole 5531. The extending portion 5511 or the inner wall of the through hole 5531 is provided with the sealing member 5512 for sealing the contact position of the extending portion 5511 and the through hole 5531 when the copper current lead 51 is inserted or pulled out. The upper end of the copper current lead 51 is fixed to the pressing cover 551 by the fiber reinforced plastic plate 571.

After the above-mentioned structure is adopted by the installation adjustment mechanism 55, when the copper current lead 51 and the superconducting current lead 52 need to contact to feed power, the connecting member 552 can be screwed downward to make the extending portion 5511 of the pressing cover 551 to move down a certain distance relative to the through hole 5531 so as to drive the copper current lead 51 and the bellows sleeve 531 to move downward by a certain distance. Consequently, the copper current lead 51 can electrically contact with the superconducting current lead 52.

When the copper current lead 51 and the superconducting current lead 52 need to be separated, the copper current lead 51 is driven to separate from the superconducting current lead 52 by unscrewing the connecting member 552. The connecting member 552 is fixed on condition that the relative position is remained between the pressing cover 551 and the protrusion 553.

The sealing member 5512 is preferably provided on a side wall of the protrusion 553 to ensure that the contact surface of the extending portion 5511 always contacts the sealing member 5512, which prevents the sealing member 5512 from being separated without the restriction of the extending portion 5511. When the sealing member 5512 is provided on the extending portion 5511, a plurality of the sealing members 5512 can be spaced apart on the extending portion 5511 to avoid affecting the sealing of the members since the sealing member 5512 is pulled out from the through hole 5531 when the extending portion 5511 is pulled out.

The pressing cover 551 and the protrusion 553 are both made of stainless steel. The connecting member 552 is a stud bolt/screw having a threaded section so as to facilitate the adjustment of the connecting member 552. The sealing member 5512, which is preferably made of a material that does not shrink in low temperature conditions, and adopts the resilient sealing ring 46.

The installation adjustment mechanism 55 and the resilient supporting device 4 may also be provided with two pressing plates and a sleeve supported by a material having a relatively large elasticity. The sleeve is arranged between the two pressing plates. The two pressing plates and the sleeve are fixed together by the locking member 45.

As shown in FIG. 3, the detachable cryostat 2 further includes the second-stage radiation shield 23 surrounding outside the first-stage radiation shield 21. The second-stage radiation shield 23 is fixedly connected to the second-stage cold chamber 53. The second-stage radiation shield 23 is a barrel-shaped structure with unsealed upper and lower ends. The first-stage radiation shield 21 is a barrel-shaped structure with an enclosed inner chamber.

The second-stage radiation shield 23 is connected to the second-stage cold chamber 53 so that the second-stage radiation shield 23 can be cooled by the cold energy from the second-stage cold chamber 53. The second-stage radiation shield 23 can reduce the radiation heat from the outside transferred to the first-stage cold chamber 22 and has a function to protect the cryogen in the first-stage cold chamber 22. The second-stage radiation shield 23 is made of a material with a high thermal conductivity, such as copper or aluminum.

When the present solution is implemented, at least one pair of snap-fit grooves 5513 are arranged on the surface opposite to the protrusion 553 and the pressing cover 551. The resilient member 44 is installed in the matching two snap-fit grooves 5513. In this solution, it is preferred that the resilient member 44 is a spring.

After the installation adjustment mechanism 55 are provided with the resilient member 44, and the connecting member 552 is unscrewed, the resilient member 44 can drive the pressing cover 551 to move upward, so as to realize the separation of the copper current lead 51 and the superconducting current lead 52, the separation can be guaranteed to be smooth and avoid vibration. After that, the connecting member 552 is screwed on and the pressing cover 551 is supported by the resilient member 44.

Figure 7:
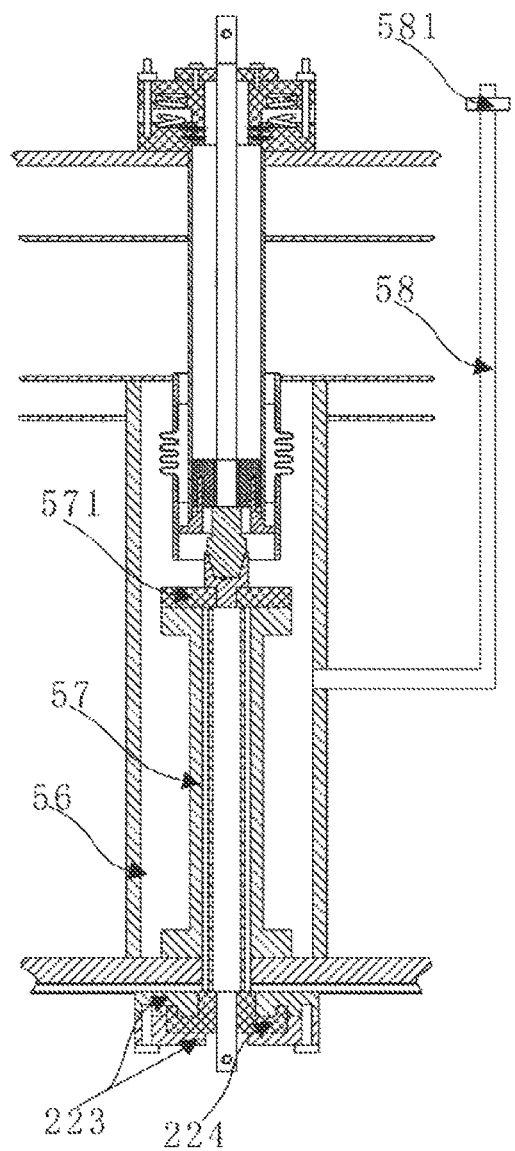
FIG. 7 is a structural schematic diagram of another embodiment of the detachable binary current lead device.

As shown in FIG. 7, the detachable binary current lead device 5 further includes the connecting sleeve 56 with two ends sealed and installed on the second-stage cold chamber 53 and the first-stage cold chamber 22, and the support sleeve 57 fixed to the first-stage cold chamber 22 for supporting the superconducting current lead 52. The superconducting current lead 52 is located in the support sleeve 57. The upper end of the superconducting current lead 52 extends out from the support sleeve 57. The bellows sleeve 531, the support sleeve 57 and the sealing structure 532 are all located in the connecting sleeve 56.

The upper end (plug and pull end) of the superconducting current lead 52 is fixed on the support sleeve 57 by the fiber reinforced plastic plate 571 so that the superconducting current lead 52 can be insulated from the support sleeve 57. The support sleeve 57 and the connecting sleeve 56 are both made of a metal with poor thermal conductivity such as stainless steel. Two ends of the connecting sleeve 56 are welded to the second-stage cold chamber 53 and the first-stage cold chamber 22, respectively.

As shown in FIG. 1, FIG. 3 and FIG. 7, the end of the superconducting current lead 52 is fixed to an inner side of the top wall of the first-stage cold chamber 22 by the two stainless steel blocks 223 and the sealing sleeve 224 (the material of the sealing sleeve 224 is the same as one of the sealing portion 5322). Specifically, the two matched stainless steel blocks 223, are provided with the through holes 5531. One of the two stainless steel blocks 223 is provided with an annular snap-fit groove, and the surface of the other stainless steel block 223 opposite to the annular snap-fit groove is provided with a groove. The sealing sleeve 224 is installed in the through holes 5531 and extends into the annular snap-fit groove and the groove.

The sealing sleeve 224 is tightly matched with the two stainless steel blocks 223 due to the shrinkage performance of the sealing sleeve 224 at the low temperature so as to achieve the sealing of the cryogen in the first-stage cold chamber 22. The cryogen contained in the first-stage cold chamber 22 can be liquid nitrogen, liquid helium, liquid argon, liquid helium or liquid hydrogen. One of the two stainless steel blocks 223 is fixed to the inner wall of the first-stage cold chamber 22 by welding. The other stainless steel block 223 is connected to the stainless steel block 223 of the first-stage cold chamber 22 by bolts. The end of the superconducting current lead 52 can be sealed by the combined action of the two stainless steel blocks 223 and the sealing sleeve 224.

The upper end (plug and pull end) of the superconducting current lead 52 is cooled by the copper current lead 51 in conduction cooling method. The end of the superconducting current lead 52 extends into the first-stage cold chamber 22 and directly contacts the cryogen so as to provide a superconducting operating environment for the entire superconducting current lead 52.

According to FIG. 7, the connecting sleeve 56 is provided with the second vacuum tube 58. The free end of the second vacuum tube 58 extends out from the cryostat 2 and is provided with the vacuum valve 581. Specifically, the second vacuum tube 58 extends to the outside through the second-stage cold chamber 53 and the top wall of the cryostat 2, and is welded to the top wall of the cryostat 2.

The connecting sleeve 56, the vacuum tube and the vacuum valve 581 can pump the connecting sleeve 56 into a vacuum state by the vacuum device before the superconducting current lead 52 is pulled away from the copper current lead 51 so as to cut off the heat conduction route from the superconducting current lead 52 to the cryogen.

After the superconducting current lead 52 is pulled away from the copper current lead 51, the parts in the connecting sleeve 56 are in a vacuum environment. Therefore, the external heat is prevented from entering the cryogenic system through the superconducting current lead 52 to reduce the heat leakage of the overall system. And it can avoid frost at the plug and pull end of the copper current lead 51 and the superconducting current lead 52 after they are separated from each other.

According to FIG. 3, when the detachable binary current lead device 5 is installed in the cryostat 2, to improve the stability between the internal components of the cryostat 2, the cryostat 2 includes at least one the first support member 25 and at least one the second support member 26. The top end of the first support member 25 is fixed to the top wall of the cryostat 2. The lower end of the first support member 25 is fixed to the top wall of the first-stage cold chamber 22 through the second-stage cold chamber 53 and the first-stage radiation shield 21.

One end of the second support member 26 is fixed to the side wall of the cryostat 2. And the other end of the second support member 26 is fixed to the side wall inside the first-stage cold chamber 22 through the first-stage radiation shield 21, the second-stage radiation shield 23, and the first-stage cold chamber 22.

In summary, in the present solution, when the resilient supporting device 4 is loosened, the cryocooler 1 can be popped up from the detachable cryostat 2 by the resilient supporting device 4 matched with the resilient circular sleeve 3. The copper current lead 51 and the superconducting current lead 52 can be stably separated by the force transmitted from the installation adjustment mechanism 55, which should also be cooperated with the bellows sleeve 531. Therefore, the conduction heat leakage can be greatly reduced from the copper current lead 51 to the cryogen in the first-stage cold chamber 22.

What is claimed is:

1. A detachable cryostat, comprising a cryocooler and a cryostat with a vacuum internal environment, wherein a first-stage cold chamber for containing a cryogen is placed in a first-stage radiation shield of the cryostat; wherein a circular sleeve and a first-stage bellows extending inwards are installed respectively at a top wall of the cryostat and a top wall of the first-stage cold chamber;

wherein a first lower conductive block connected to a top wall of the first-stage radiation shield is fixed at a middle portion of the circular sleeve; a bottom of the circular sleeve and a bottom of the first-stage bellows are respectively sealed with a second upper conductive block and a second lower conductive block, and the circular sleeve extends into the first-stage bellows when extended;

a first-stage cold head of the cryocooler is sleeved with a first upper conductive block matched with the first lower conductive block, and a second-stage cold head of the cryocooler is configured to drive the second upper conductive block to be matched with the second lower conductive block; the cryocooler is installed in the circular sleeve, and an upper end of the circular sleeve is fixed on a supporting device; and when the supporting device is pressed, the first upper conductive block contacts the first lower conductive block, and the second lower conductive block contacts the second upper conductive block; when the supporting device is loosened, the first upper conductive block is separated from the first lower conductive block, and the second lower conductive block is separated from the second upper conductive block, wherein when the first-stage cold chamber is configured to place superconducting magnets, the detachable cryostat further comprises at least a pair of binary current leads fixed to a top end of the cryostat and extended into the first-stage cold chamber, and the at least a pair of binary current leads are connected to the first lower conductive block by copper braids and an insulating layer made of a conductive material for cooling when a second-stage cold chamber is taken out, and wherein the binary current lead comprises a superconducting current lead and a copper current lead, wherein the superconducting current lead and the copper current lead are detachable; the copper current lead is fixed to the cryostat through an installation adjustment mechanism, wherein the copper current lead contacts the superconducting current lead when the installation adjustment mechanism is pressed; and the copper current lead is separated from the superconducting current lead when the installation adjustment mechanism is loosened.

2. The detachable cryostat according to claim 1, wherein, the circular sleeve comprises a first-stage bellows sleeve fixed on the supporting device and a second-stage bellows sleeve located in the first-stage radiation shield; the first-stage bellows sleeve is fixedly connected to the second-stage bellows sleeve through the first lower conductive block, and the second-stage bellows sleeve extends into the first-stage bellows in an elongated condition; and the second upper conductive block is fixed at a bottom of the second-stage bellows sleeve.

3. The detachable cryostat according to claim 1, wherein, the supporting device comprises a lower flange installed on the top wall of the cryostat through a connecting sleeve, and an upper flange sleeved on the cryocooler; opposite faces of the upper flange and the lower flange are provided with annular grooves matched with one another; a member is placed in each annular groove; the upper flange and the lower flange are fastened by a locking member; and a sealing ring is installed between the upper flange extended into the lower flange and the lower flange.

4. The detachable cryostat according to claim 1, wherein, the circular sleeve is provided with a first vacuum tube; and a free end of the first vacuum tube extends to an outside of the cryostat.

5. The detachable cryostat according to claim 1, wherein, the installation adjustment mechanism comprises a protrusion fixed to an upper end of a metal sleeve, and a pressing cover matched with the protrusion through a connecting member; the protrusion is provided with a through hole allowing an extending portion of the pressing cover to insert into the through hole; the extending portion or an inner wall of the protrusion is provided with a sealing member for sealing a contact part of the extending portion and the protrusion when the copper current lead is inserted or pulled out; and an upper end of the copper current lead is fixed to the pressing cover by a fiber reinforced plastic plate.

6. The detachable cryostat according to claim 5, wherein, opposite surfaces of the protrusion and the pressing cover are provided with at least a pair of snap-fit grooves matched with one another, and a member is installed in the at least a pair of snap-fit grooves matched with one another.

7. The detachable cryostat according to claim 5, wherein, the sealing structure comprises a base sealed and fixed to a lower end of the bellows sleeve; the base has a convex portion extending upward and the through hole allowing the lower end of the copper current lead to pass through the through hole; the lower end of the copper current lead is assembled with a sealing portion, and a lower surface of the sealing portion is provided with an annular groove matched with the convex portion.

8. The detachable cryostat according to claim 7, wherein, the metal sleeve is provided with a cryogen inlet allowing the cryogen in the second-stage cold chamber to enter the metal sleeve for cooling the sealing portion and the copper current lead.

9. The detachable cryostat according to claim 7, wherein, the sealing portion is made of a material, and the material shrinks at a low temperature.

10. A detachable cryostat, comprising a cryocooler and a cryostat with a vacuum internal environment, wherein a first-stage cold chamber for containing a cryogen is placed in a first-stage radiation shield of the cryostat; wherein a circular sleeve and a first-stage bellows extending inwards are installed respectively at a top wall of the cryostat and a top wall of the first-stage cold chamber;

wherein a first lower conductive block connected to a top wall of the first-stage radiation shield is fixed at a middle portion of the circular sleeve; a bottom of the circular sleeve and a bottom of the first-stage bellows are respectively sealed with a second upper conductive block and a second lower conductive block, and the circular sleeve extends into the first-stage bellows when extended;

a first-stage cold head of the cryocooler is sleeved with a first upper conductive block matched with the first lower conductive block, and a second-stage cold head of the cryocooler is configured to drive the second upper conductive block to be matched with the second lower conductive block; the cryocooler is installed in the circular sleeve, and an upper end of the circular sleeve is fixed on a supporting device; and when the supporting device is pressed, the first upper conductive block contacts the first lower conductive block, and the second lower conductive block contacts the second upper conductive block; when the supporting device is loosened, the first upper conductive block is separated from the first lower conductive block, and the second lower conductive block is separated from the second upper conductive block, wherein when the first-stage cold chamber is configured to place superconducting magnets, the detachable cryostat further comprises a detachable binary current lead device; the detachable binary current lead device comprises a superconducting current lead, a copper current lead, and a second-stage cold chamber installed in the cryostat for containing the cryogen and cooling the copper current lead; wherein the superconducting current lead and the copper current lead are separated, and the superconducting current lead extends into the first-stage cold chamber, and is fixed on the top wall of the first-stage cold chamber;

the copper current lead is partially accommodated in a metal sleeve fixed on the top wall of the cryostat; a bellows sleeve is fixed at a bottom of the second-stage cold chamber; and the metal sleeve passes through the second-stage cold chamber and extends into the bellows sleeve; and a sealing structure for preventing the cryogen in the second-stage cold chamber from leaking out of one end of the bellows sleeve is fixedly installed between a lower end of the bellows sleeve, a lower end of the copper current lead and a lower end of the metal sleeve; the lower end of the copper current lead passes through the sealing structure; the copper current lead is fixed to the cryostat through an installation adjustment mechanism, wherein the superconducting current lead contacts the copper current lead when the installation adjustment mechanism is pressed; and the superconducting current lead is separated from the copper current lead when the installation adjustment mechanism is loosened.

11. The detachable cryostat according to claim 10, wherein, further comprising a second-stage radiation shield surrounding outside the first-stage radiation shield, and the second-stage radiation shield is fixedly connected to the second-stage cold chamber.

12. The detachable cryostat according to claim 10, wherein, a contact part between the copper current lead and the superconducting current lead forms a plug and pull end matched with each other, and the contact part comprises structures of a protrusion and a groove matched with one another, a plug and a socket matched with one another, and wavy concave-convex surfaces matched with one another or sloped surfaces fitting to one another.

13. The detachable cryostat according to claim 11, wherein, the detachable binary current lead device further comprises a connecting sleeve and a support sleeve fixed to the first-stage cold chamber for supporting the superconducting current lead; two ends of the connecting sleeve are sealed and installed on the first-stage cold chamber and the second-stage cold chamber; and the superconducting current lead is located in the support sleeve, an upper end of the superconducting current lead extends out from the support sleeve; the bellows sleeve, the support sleeve, and the sealing structure are all located in the connecting sleeve.

14. The detachable cryostat according to claim 13, wherein, the connecting sleeve is provided with a second vacuum tube; and a free end of the second vacuum tube extends out from the cryostat.

* * * * *